US012753054B2

(12) United States Patent
Schmidt et al.

(10) Patent No.: US 12,753,054 B2
(45) Date of Patent: Oct. 6, 2026

(54) VALIDATING THE POSE OF A ROBOTIC VEHICLE THAT ALLOWS IT TO INTERACT WITH AN OBJECT ON FIXED INFRASTRUCTURE

(71) Applicant: Seegrid Corporation, Pittsburgh, PA (US)

(72) Inventors: Benjamin G. Schmidt, Wexford, PA (US); Erich L. Foster, Pittsburgh, PA (US)

(73) Assignee: SEEGRID CORPORATION, Pittsburgh, PA (US)

( * ) Notice: Subject to any disclaimer, the term of this patent is extended or adjusted under 35 U.S.C. 154(b) by 51 days.

(21) Appl. No.: 18/849,094

(22) PCT Filed: Mar. 28, 2023

(86) PCT No.: PCT/US2023/016554

§ 371 (c)(1),
(2) Date: Sep. 20, 2024

(87) PCT Pub. No.: WO2023/192270

PCT Pub. Date: Oct. 5, 2023

(65) Prior Publication Data

US 2025/0230023 A1 Jul. 17, 2025

Related U.S. Application Data

(60) Provisional application No. 63/324,199, filed on Mar. 28, 2022.

(51) Int. Cl.

| | |
|---|---|
| ***B66F 9/06*** | (2006.01) |
| ***G05D 1/622*** | (2024.01) |

(Continued)

(52) U.S. Cl.
CPC ............. *B66F 9/063* (2013.01); *G05D 1/622* (2024.01); *G05D 1/667* (2024.01); *G05D 2105/28* (2024.01)

(58) Field of Classification Search
CPC ........ B66F 9/063; G05D 1/622; G05D 1/667; G05D 2105/28; G05D 1/2465; G05D 2107/70; G05D 2109/10; G05D 1/2424
See application file for complete search history.

(56) References Cited

U.S. PATENT DOCUMENTS 10,108,194 B1 * 10/2018 Russell ................ G05D 1/0212
11,348,269 B1 * 5/2022 Ebrahimi Afrouzi ... G01S 17/48
(Continued)

FOREIGN PATENT DOCUMENTS

EP 3961259 3/2022
WO 2020214723 10/2020

OTHER PUBLICATIONS

International Search Report and Written Opinion dated Jun. 14, 2023 issued in International Application No. PCT/US2023/016554.
(Continued)

*Primary Examiner* — Donald J Wallace
*Assistant Examiner* — Jalal C Coduroglu
(74) *Attorney, Agent, or Firm* — Onello & Mello PC

(57) ABSTRACT

A robotic vehicle comprising a chassis and a manipulatable payload engagement portion, at least one sensor configured to acquire real-time sensor data, a pose validation system comprising computer program code executable by at least one processor to evaluate the sensor data to: determine if a goal pose of the robotic vehicle will result in a collision with infrastructure upon which the object is located when the engagement portion engages the object. If a potential collision is detected, the pose validation system can generate a
(Continued)

signal to adjust the robotic vehicle's pose to avoid the collision. A corresponding method is also provided.

24 Claims, 7 Drawing Sheets

(51) Int. Cl.
*G05D 1/667* (2024.01)
*G05D 105/28* (2024.01)

(56) References Cited

U.S. PATENT DOCUMENTS

| | | | | |
|---|---|---|---|---|
| 11,493,925 | B2 * | 11/2022 | Moore | G01S 17/89 |
| 11,709,489 | B2 * | 7/2023 | Artes | G05D 1/0016 701/25 |
| 2017/0285644 | A1 | 10/2017 | Ichinose et al. | |
| 2020/0101971 | A1 * | 4/2020 | Fan | G01S 17/10 |
| 2020/0223676 | A1 * | 7/2020 | Shah | B66F 9/0755 |
| 2021/0089040 | A1 * | 3/2021 | Ebrahimi Afrouzi | G05D 1/0248 |
| 2021/0278850 | A1 * | 9/2021 | Moore | G05D 1/0214 |
| 2021/0284198 | A1 | 9/2021 | Schmidt et al. | |
| 2021/0349468 | A1 | 11/2021 | Bukhari et al. | |
| 2022/0066464 | A1 * | 3/2022 | Takao | G01S 17/89 |
| 2023/0202814 | A1 * | 6/2023 | Toyoshima | B66F 9/19 414/373 |
| 2023/0409032 | A1 * | 12/2023 | Artes | G05D 1/0016 |

OTHER PUBLICATIONS

Extended European Search Report dated Nov. 14, 2025 issued in European Application No. 23781684.8.

* cited by examiner

VALIDATING THE POSE OF A ROBOTIC VEHICLE THAT ALLOWS IT TO INTERACT WITH AN OBJECT ON FIXED INFRASTRUCTURE

CROSS REFERENCE TO RELATED APPLICATIONS

The present application claims priority to U.S. Provisional Appl. 63/324,199 filed on Mar. 28, 2022, entitled VALIDATING THE POSE OF ANAMR THAT ALLOWS IT TO INTERACT WITH AN OBJECT ON FIXED INFRASTRUCTURE, which is incorporated herein by reference in its entirety.

The present application may be related to U.S. Provisional Appl. 63/430,184 filed on Dec. 5, 2022, entitled Just in Time Destination Definition and Route Planning; U.S. Provisional Appl. 63/430,190 filed on Dec. 5, 2022, entitled Configuring a System that Handles Uncertainty with Human and Logic Collaboration in a Material Flow Automation Solution; U.S. Provisional Appl. 63/430,182 filed on Dec. 5, 2022, entitled Composable Patterns of Material Flow Logic for the Automation of Movement; U.S. Provisional Appl. 63/430,174 filed on Dec. 5, 2022, entitled Process Centric User Configurable Step Framework for Composing Material Flow Automation; U.S. Provisional Appl. 63/430,195 filed on Dec. 5, 2022, entitled Generation of "Plain Language" Descriptions Summary of Automation Logic; U.S. Provisional Appl. 63/430,171 filed on Dec. 5, 2022, entitled Hybrid Autonomous System Enabling and Tracking Human Integration into Automated Material Flow; U.S. Provisional Appl. 63/430,180 filed on Dec. 5, 2022, entitled A System for Process Flow Templating and Duplication of Tasks Within Material Flow Automation; U.S. Provisional Appl. 63/430,200 filed on Dec. 5, 2022, entitled A Method for Abstracting Integrations Between Industrial Controls and Autonomous Mobile Robots (AMRs); and U.S. Provisional Appl. 63/430,170 filed on Dec. 5, 2022, entitled Visualization of Physical Space Robot Queuing Areas as Non Work Locations for Robotic Operations, each of which is incorporated herein by reference in its entirety.

The present application may be related to U.S. Provisional Appl. 63/348,520 filed on Jun. 3, 2022, entitled System and Method for Generating Complex Runtime Path Networks from Incomplete Demonstration of Trained Activities; U.S. Provisional Appl. 63/410,355 filed on Sep. 27, 2022, entitled Dynamic, Deadlock-Free Hierarchical Spatial Mutexes Based on a Graph Network; U.S. Provisional Appl. 63/346,483 filed on May 27, 2022, entitled System and Method for Performing Interactions with Physical Objects Based on Fusion of Multiple Sensors; and U.S. Provisional Appl. 63/348,542 filed on Jun. 3, 2022, entitled Lane Grid Setup for Autonomous Mobile Robots (AMRs); U.S. Provisional Appl. 63/423,679, filed Nov. 8, 2022, entitled System and Method for Definition of a Zone of Dynamic Behavior with a Continuum of Possible Actions and Structural Locations within Same; U.S. Provisional Appl. 63/423,683, filed Nov. 8, 2022, entitled System and Method for Optimized Traffic Flow Through Intersections with Conditional Convoying Based on Path Network Analysis; U.S. Provisional Appl. 63/423,538, filed Nov. 8, 2022, entitled Method for Calibrating Planar Light-Curtain; each of which is incorporated herein by reference in its entirety.

The present application may be related to U.S. Provisional Appl. 63/324,182 filed on Mar. 28, 2022, entitled A Hybrid, Context-Aware Localization System For Ground Vehicles; U.S. Provisional Appl. 63/324,184 filed on Mar. 28, 2022, entitled Safety Field Switching Based On End Effector Conditions; U.S. Provisional Appl. 63/324,185 filed on Mar. 28, 2022, entitled Dense Data Registration From a Vehicle Mounted Sensor Via Existing Actuator; U.S. Provisional Appl. 63/324,187 filed on Mar. 28, 2022, entitled Extrinsic Calibration Of A Vehicle-Mounted Sensor Using Natural Vehicle Features; U.S. Provisional Appl. 63/324,188 filed on Mar. 28, 2022, entitled Continuous And Discrete Estimation Of Payload Engagement/Disengagement Sensing; U.S. Provisional Appl. 63/324,190 filed on Mar. 28, 2022, entitled Passively Actuated Sensor Deployment; U.S. Provisional Appl. 63/324,192 filed on Mar. 28, 2022, entitled Automated Identification Of Potential Obstructions In A Targeted Drop Zone; U.S. Provisional Appl. 63/324,193 filed on Mar. 28, 2022, entitled Localization Of Horizontal Infrastructure Using Point Clouds; U.S. Provisional Appl. 63/324,195 filed on Mar. 28, 2022, entitled Navigation Through Fusion of Multiple Localization Mechanisms and Fluid Transition Between Multiple Navigation Methods; U.S. Provisional Appl. 63/324,198 filed on Mar. 28, 2022, entitled Segmentation Of Detected Objects Into Obstructions And Allowed Objects; and U.S. Provisional Appl. 63/324,201 filed on Mar. 28, 2022, entitled A System For AMRs That Leverages Priors When Localizing Industrial Infrastructure; each of which is incorporated herein by reference in its entirety.

The present application may be related to U.S. patent application Ser. No. 11/350,195, filed on Feb. 8, 2006, U.S. Pat. No. 7,446,766, Issued on Nov. 4, 2008, entitled Multidimensional Evidence Grids and System and Methods for Applying Same; U.S. patent application Ser. No. 12/263,983 filed on Nov. 3, 2008, U.S. Pat. No. 8,427,472, Issued on Apr. 23, 2013, entitled Multidimensional Evidence Grids and System and Methods for Applying Same; U.S. patent application Ser. No. 11/760,859, filed on Jun. 11, 2007, U.S. Pat. No. 7,880,637, Issued on Feb. 1, 2011, entitled Low-Profile Signal Device and Method For Providing Color-Coded Signals; U.S. patent application Ser. No. 12/361,300 filed on Jan. 28, 2009, U.S. Pat. No. 8,892,256, Issued on Nov. 18, 2014, entitled Methods For Real-Time and Near-Real Time Interactions With Robots That Service A Facility; U.S. patent application Ser. No. 12/361,441, filed on Jan. 28, 2009, U.S. Pat. No. 8,838,268, Issued on Sep. 16, 2014, entitled Service Robot And Method Of Operating Same; U.S. patent application Ser. No. 14/487,860, filed on Sep. 16, 2014, U.S. Pat. No. 9,603,499, Issued on Mar. 28, 2017, entitled Service Robot And Method Of Operating Same; U.S. patent application Ser. No. 12/361,379, filed on Jan. 28, 2009, U.S. Pat. No. 8,433,442, Issued on Apr. 30, 2013, entitled Methods For Repurposing Temporal-Spatial Information Collected By Service Robots; U.S. patent application Ser. No. 12/371,281, filed on Feb. 13, 2009, U.S. Pat. No. 8,755,936, Issued on Jun. 17, 2014, entitled Distributed Multi-Robot System; U.S. patent application Ser. No. 12/542,279, filed on Aug. 17, 2009, U.S. Pat. No. 8,169,596, Issued on May 1, 2012, entitled System And Method Using A Multi-Plane Curtain; U.S. patent application Ser. No. 13/460,096, filed on Apr. 30, 2012, U.S. Pat. No. 9,310,608, Issued on Apr. 12, 2016, entitled System And Method Using A Multi-Plane Curtain; U.S. patent application Ser. No. 15/096,748, filed on Apr. 12, 2016, U.S. Pat. No. 9,910,137, Issued on Mar. 6, 2018, entitled System and Method Using A Multi-Plane Curtain; U.S. patent application Ser. No. 13/530,876, filed on Jun. 22, 2012, U.S. Pat. No. 8,892,241, Issued on Nov. 18, 2014, entitled Robot-Enabled Case Picking; U.S. patent application Ser. No. 14/543,241, filed on Nov. 17, 2014, U.S. Pat. No. 9,592,961, Issued on Mar. 14, 2017, entitled Robot-Enabled Case Picking; U.S. patent application Ser. No. 13/168,639, filed on Jun. 24, 2011, U.S. Pat. No. 8,864,164, Issued on Oct. 21, 2014, entitled Tugger Attachment; US Design Patent Appl. 29/398,127, filed on Jul. 26, 2011, U.S. Pat. No. D680,142, Issued on Apr. 16, 2013, entitled Multi-Camera Head; US Design Patent Appl. 29/471,328, filed on Oct. 30, 2013, U.S. Pat. No. D730,847, Issued on Jun. 2, 2015, entitled Vehicle Interface Module; U.S. patent application Ser. No. 14/196,147, filed on Mar. 4, 2014, U.S. Pat. No. 9,965,856, Issued on May 8, 2018, entitled Ranging Cameras Using A Common Substrate; U.S. patent application Ser. No. 16/103,389, filed on Aug. 14, 2018, U.S. Pat. No. 11,292,498, Issued on Apr. 5, 2022, entitled Laterally Operating Payload Handling Device; U.S. patent application Ser. No. 16/892,549, filed on Jun. 4, 2020, US Publication Number 2020/0387154, Published on Dec. 10, 2020, entitled Dynamic Allocation And Coordination of Auto-Navigating Vehicles and Selectors; U.S. patent application Ser. No. 17/163,973, filed on Feb. 1, 2021, US Publication Number 2021/0237596, Published on Aug. 5, 2021, entitled Vehicle Auto-Charging System and Method; U.S. patent application Ser. No. 17/197,516, filed on Mar. 10, 2021, US Publication Number 2021/0284198, Published on Sep. 16, 2021, entitled Self-Driving Vehicle Path Adaptation System and Method; U.S. patent application Ser. No. 17/490,345, filed on Sep. 30, 2021, US Publication Number 2022-0100195, published on Mar. 31, 2022, entitled Vehicle Object-Engagement Scanning System And Method; U.S. patent application Ser. No. 17/478,338, filed on Sep. 17, 2021, US Publication Number 2022-0088980, published on Mar. 24, 2022, entitled Mechanically-Adaptable Hitch Guide each of which is incorporated herein by reference in its entirety.

FIELD OF INTEREST

The present inventive concepts relate to systems and methods in the field of robotic vehicles, such as autonomous mobile robots (AMRs). Aspects of the inventive concepts are applicable to any mobile robotics application involving manipulation of a payload. More generally, it is applicable to any mobile robot configured to interact with infrastructure to pick or drop off the payload.

BACKGROUND

When an autonomous mobile robot (AMR) has to interact with an object that is on top of some sort of fixed infrastructure (for example, a table, conveyor belt, or racking), the AMR must get itself to a pose that allows it to perform that interaction. The "pose" is location and orientation of the AMR. The object can be a payload to be transported by the AMR.

Getting into a pose generally involves the chassis of the AMR on the floor, while some form of manipulator extends from the chassis in order to interact with the object, e.g., a payload. The manipulator has limitations as to how far it can reach out to interact with the payload, which necessitates that the pose of the chassis on the floor has to allow the manipulator to properly reach the payload.

The problem is that the payload may sit on the infrastructure above ground level in such a position that the AMR is not able to achieve the proper pose without colliding with the infrastructure, e.g., a table or shelving. This can be particularly difficult if a portion of the chassis protrudes with a small, low profile (such as outriggers), which may prevent the AMR from reaching the required goal pose if not permitted to move in underneath the fixed infrastructure (for example: allowing outriggers to move underneath the table that the payload is on top of). Outriggers are a type of an AMR that extend from the AMR chassis in the direction of the forks and stabilize the AMR when the forks carry a payload, e.g., a pallet of goods. FIG. 1 provides embodiments of various types of pallets known in the art.

Currently, the AMR has a manually trained pose that it can achieve that does not collide with infrastructure. Any obstruction detection is turned off as the AMR approaches the payload. Manually training of the pose with obstruction sensors turned off does not allow the AMR to adjust its approach based on the position of the payload, which may not have the precise orientation presumed with the trained pose of the AMR.

It would be advantageous for an AMR to be able to determine if it will be able to reach the required pose of the chassis to interact with the payload without colliding with any infrastructure, including a fixed infrastructure, and to adjust its pose to accommodate the actual orientation of the payload.

SUMMARY OF THE INVENTION

The inventive concepts provide a way for a robotic vehicle, e.g., an AMR, to determine if it will be able to reach the required pose of the chassis to interact with the payload without colliding with any infrastructure, including a fixed infrastructure.

In accordance with one aspect of the inventive concepts, provided is an autonomous mobile robot (AMR), comprising: a chassis and a manipulatable payload engagement portion; sensors configured to acquire real-time sensor data; a pose validation system comprising computer program code executable by at least one processor to evaluate the sensor data to: determine a pose of an object located on an infrastructure; process at least some of the sensor data to generate at least one exclusion region and/or volume; and exclude sensor data from the at least one exclusion region and/or volume to determine whether the AMR will collide with the infrastructure if a pose of the AMR matches the goal pose.

In various embodiments, the AMR is configured to adjust a pose of the AMR if a potential collision with the infrastructure is determined.

In various embodiments, the pose validation system is configured to process at least some of the sensor data from at least one sensor to generate at least one two-dimensional (2D) polygon and/or at least one three-dimensional (3D) volume between the AMR and the infrastructure to determine whether the AMR taking the goal pose will result in a collision with infrastructure.

In various embodiments, the pose validation system is configured to process sensor data from at least one first sensor to generate a two-dimensional (2D) polygon around the goal pose and to exclude points from the outside the 2D polygon to determine whether the AMR taking the goal pose will result in a collision with infrastructure.

In various embodiments, the pose validation system is configured to process sensor data from at least one second sensor to generate a three-dimensional (3D) volume between the chassis and the payload engagement portion and to exclude points from the 3D volume to determine whether the AMR taking the goal pose will result in a collision with infrastructure.

In various embodiments, the at least one first sensor includes a sensor different from the at least one second sensor.

In various embodiments, the payload engagement portion is a pair of forks and the chassis includes outriggers and the 3D volume is located between the forks and the outriggers.

In various embodiments, one or more of the forks includes at least one LiDAR scanner.

In various embodiments, at least some of the sensor data includes point cloud data.

In various embodiments, the sensors include at least one 3D camera.

In various embodiments, the sensors include at least one LiDAR scanner.

In various embodiments, the infrastructure includes a table and/or a shelf.

In accordance with another aspect of the inventive concepts, provided is a providing an autonomous mobile robot (AMR) having a chassis and a manipulatable payload engagement portion, sensors configured to acquire real-time sensor data, and a pose validation system comprising computer program code executable by at least one processor; and the pose validation system evaluating at least some of the sensor data to validate a pose of the AMR, including: determining a pose of an object located on or near an infrastructure; processing at least some of the sensor data to generate at least one exclusion region and/or volume; and excluding sensor data from the at least one exclusion region and/or volume to determine whether the AMR will collide with the infrastructure if a pose of the AMR matches the goal pose.

In various embodiments, the method further comprises the AMR adjusting its pose if a potential collision with the infrastructure is determined.

In various embodiments, the method further comprises processing at least some of the sensor data from at least one sensor to generate at least one two-dimensional (2D) polygon and/or at least one three-dimensional (3D) volume between the AMR and the infrastructure to determine whether the AMR taking the goal pose will result in a collision with infrastructure.

In various embodiments, the method further comprises processing at least some of the sensor data from at least one first sensor to generate a two-dimensional (2D) polygon around the goal pose and excluding points from the outside the 2D polygon to determine whether the AMR taking the goal pose will result in a collision with infrastructure.

In various embodiments, the method further comprises processing at least some of the sensor data from at least one second sensor to generate a three-dimensional (3D) volume between the chassis and the payload engagement portion and excluding points from the 3D volume to determine whether the AMR taking the goal pose will result in a collision with infrastructure.

In various embodiments, the at least one first sensor includes a sensor different from the at least one second sensor.

In various embodiments, the 3D volume is located between the forks and the outriggers.

In various embodiments, one or more of the forks includes at least one LiDAR scanner.

In various embodiments, at least some of the sensor data includes point cloud data.

In various embodiments, the sensors include at least one 3D camera.

In various embodiments, the sensors include at least one LiDAR scanner.

In various embodiments, the infrastructure includes a table and/or shelf.

BRIEF DESCRIPTION OF THE DRAWINGS

The present invention will become more apparent in view of the attached drawings and accompanying detailed description. The embodiments depicted therein are provided by way of example, not by way of limitation, wherein like reference numerals refer to the same or similar elements. In the drawings.

DESCRIPTION OF PREFERRED EMBODIMENT

It will be understood that, although the terms first, second, etc. may be used herein to describe various elements, these elements should not be limited by these terms. These terms are used to distinguish one element from another, but not to imply a required sequence of elements. For example, a first element can be termed a second element, and, similarly, a second element can be termed a first element, without departing from the scope of the present invention. As used herein, the term "and/or" includes any and all combinations of one or more of the associated listed items.

It will be understood that when an element is referred to as being "on" or "connected" or "coupled" to another element, it can be directly on or connected or coupled to the other element or intervening elements may be present. In contrast, when an element is referred to as being "directly on" or "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, steps, operations, elements, and/or components, but do not preclude the presence or addition of one or more other features, steps, operations, elements, components, and/or groups thereof.

The inventive concepts provide a way for a mobile robot, such as an AMR, to determine if it will be able to reach the required pose of the chassis to interact with the payload without colliding with any infrastructure, including a fixed infrastructure.

Figure 2:
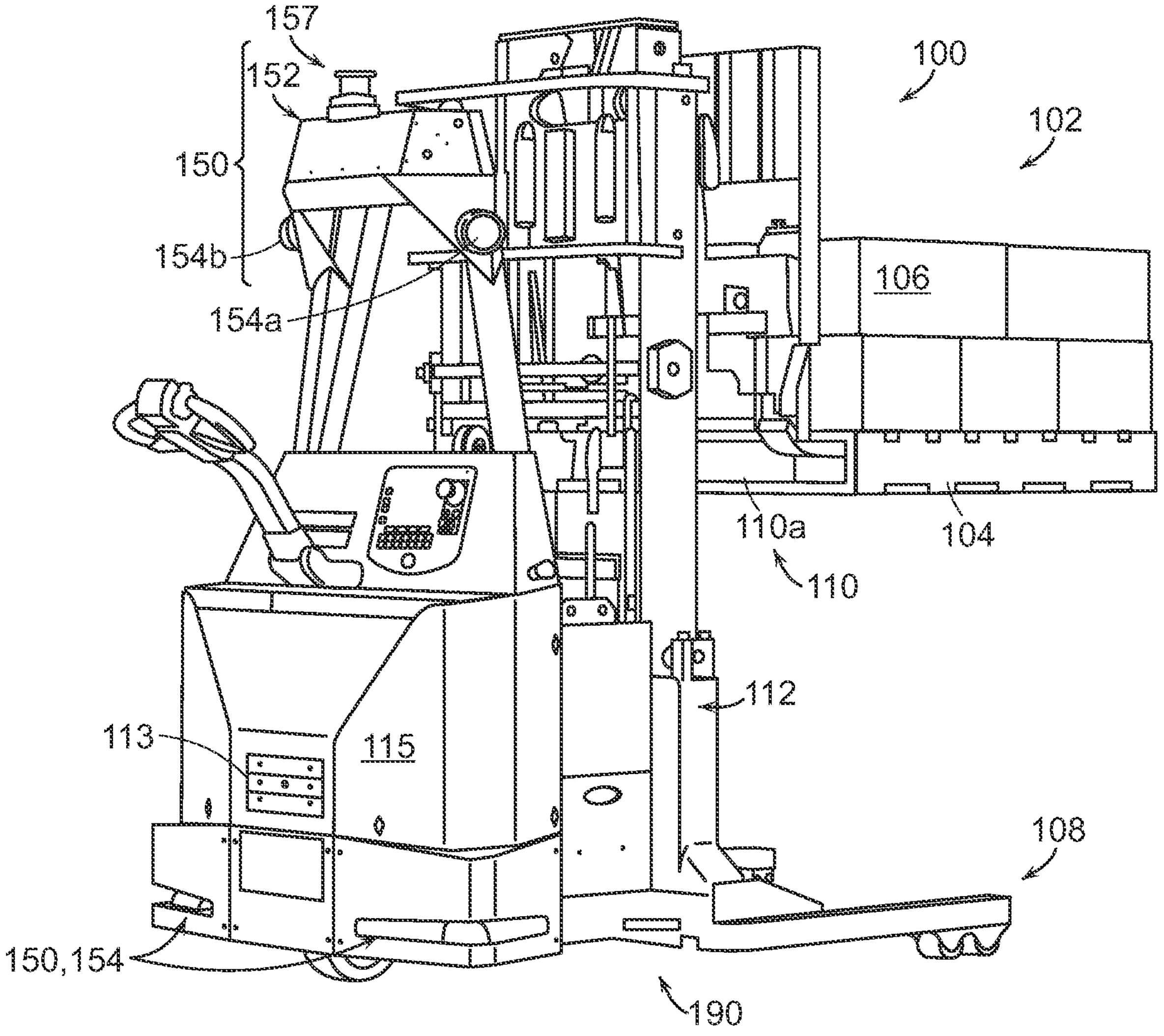
FIG. 2 is a perspective view of a robotic vehicle in the form of an AMR forklift that can be configured to implement pose validation, in accordance with aspects of the inventive concepts.
Figure 3:
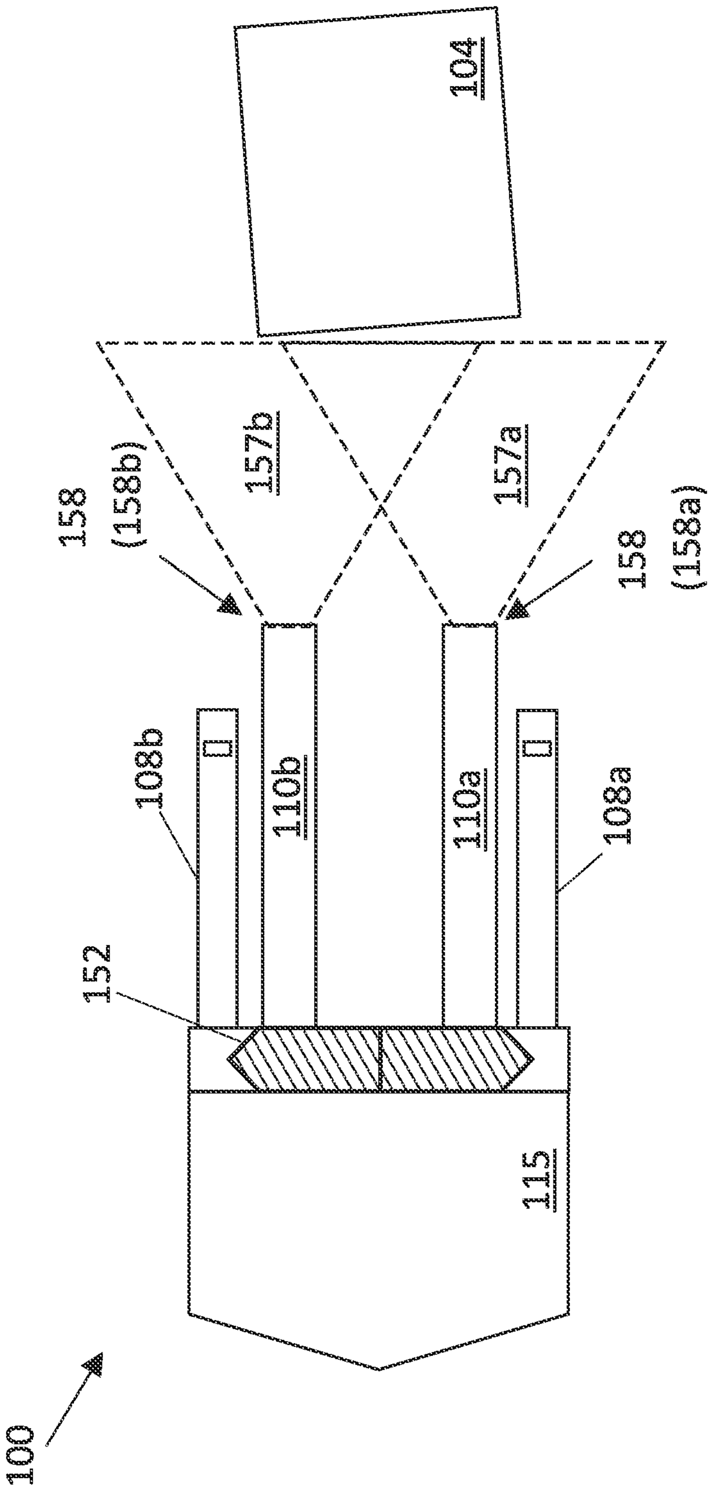
FIG. 3 is a top view of the robotic vehicle of FIG. 2.
Figure 4:
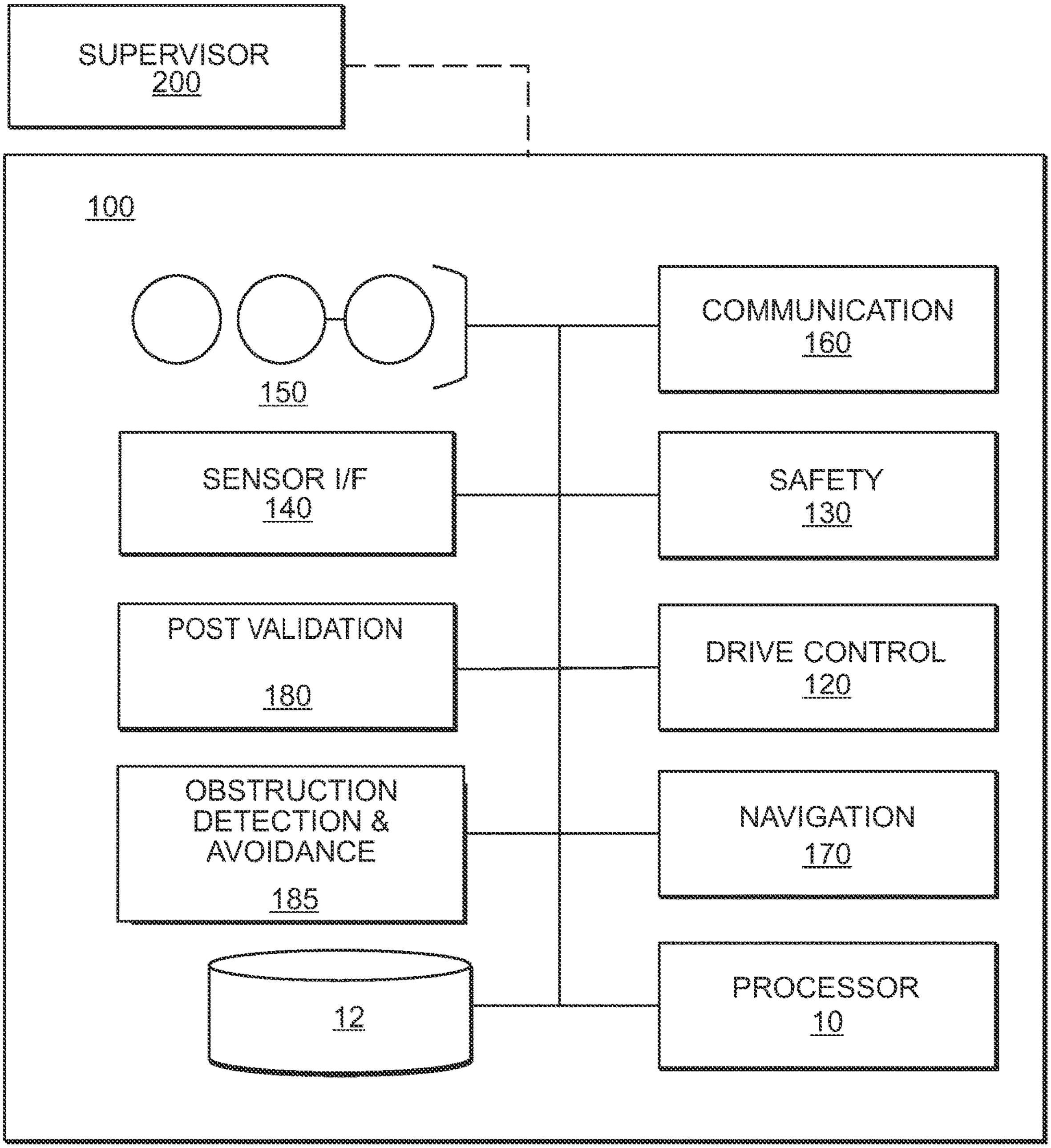
FIG. 4 is a block diagram of an embodiment of functional modules of the robotic vehicle of FIGS. 2 and 3, in accordance with aspects of the inventive concepts.
Figure 5:
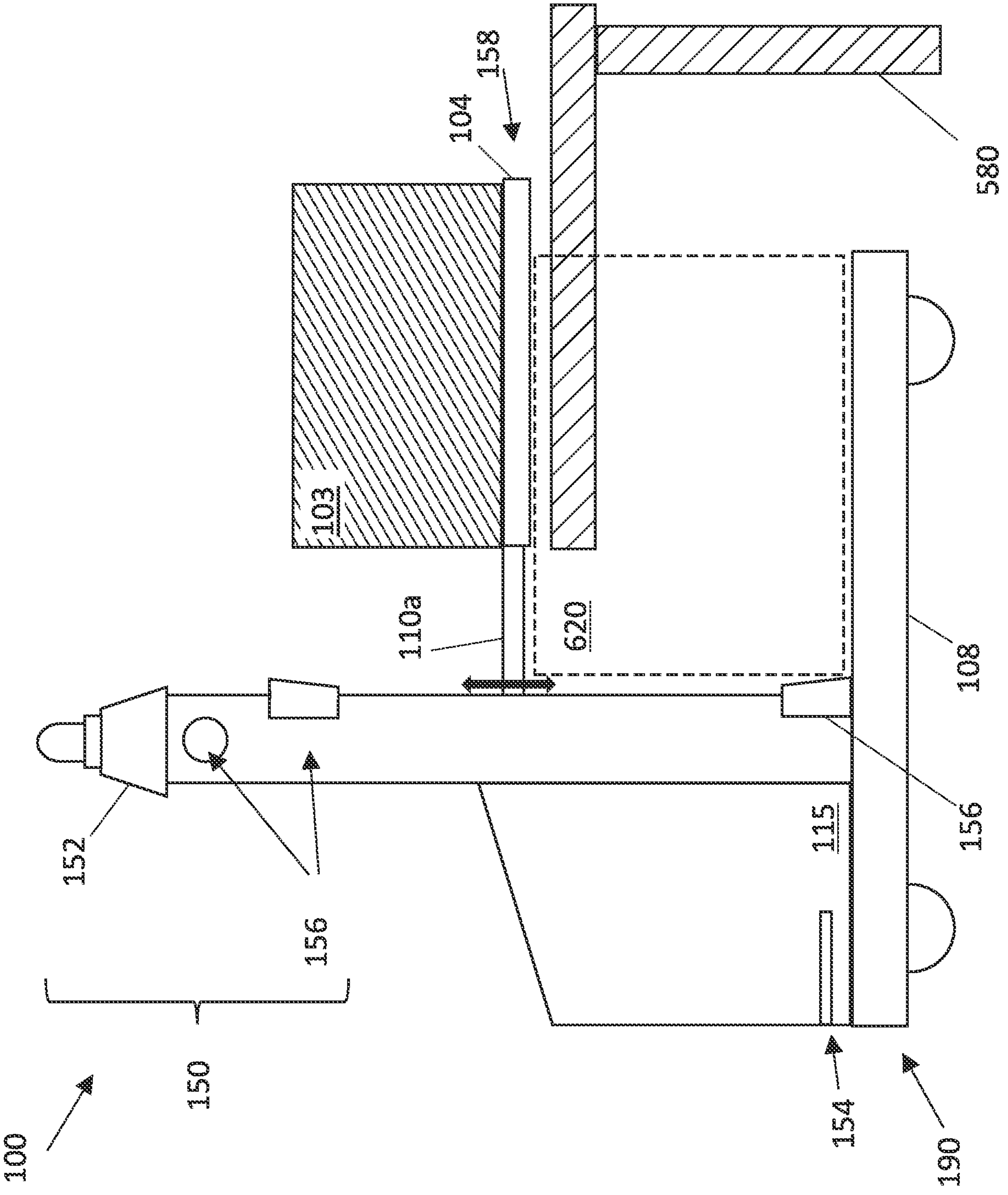
FIG. 5 is a diagram of the robotic vehicle of FIG. 1 configured to validate its pose relative to a fixed infrastructure, in accordance with aspects of the inventive concepts.
Figure 6:
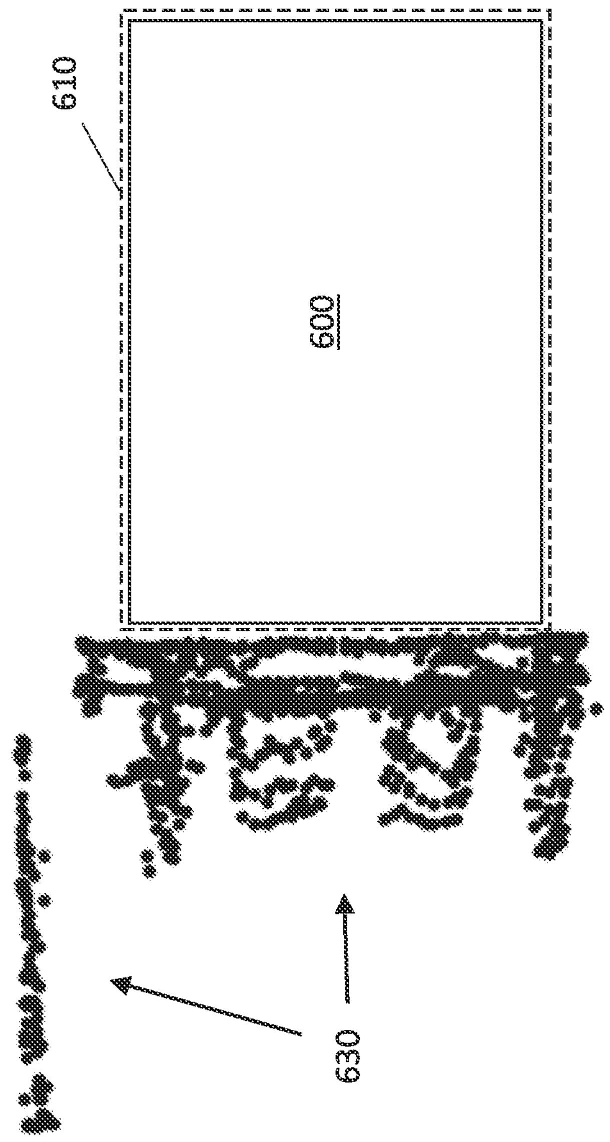
FIG. 6 is a diagram of sensor data acquired by sensors of the robotic vehicle relating to the infrastructure, in accordance with aspects of the inventive concepts.

FIG. 2 is a perspective view of a robotic vehicle in the form of an AMR forklift that can be configured to implement pose validation, in accordance with aspects of the inventive concepts. FIG. 3 is a top view of an embodiment of the robotic vehicle of FIG. 2. FIG. 4 is a block diagram of an embodiment of functional modules of the robotic vehicle of FIGS. 2 and 3, in accordance with aspects of the inventive concepts. FIG. 5 is another diagram of the robotic vehicle configured to validate its pose relative to a fixed infrastructure, in accordance with aspects of the inventive concepts. FIG. 6 is a diagram of sensor data acquired by sensors of the robotic vehicle relating to the infrastructure, in accordance with aspects of the inventive concepts.

Referring to FIG. 2, in this embodiment, the robotic vehicle 100 includes a payload area 102 configured to transport a payload 106, e.g., pallet 104 loaded with goods. The payload 106 can take the form of a palletized load in some embodiments. To engage and carry the pallet 104, the robotic vehicle may include a pair of forks 110, including a first and second forks 10*a,b*, that slide into pockets of the pallet 104. Outriggers 108 extend from the robotic vehicle chassis 190 in the direction of the forks 110 to stabilize the vehicle, particularly when carrying the palletized payload 106. The robotic vehicle 100 can also include a main housing 115 within which various control elements and subsystems can be disposed, including those that enable the robotic vehicle to navigate from place to place. The robotic vehicle 100 can comprise a battery area, e.g., within or proximate the main housing 115, for holding one or more batteries. In various embodiments, the one or more batteries can be configured for charging via a charging interface 113.

The robotic vehicle 100 may include a plurality of sensors 150 that provide various forms of sensor data that enable the robotic vehicle to safely navigate throughout an environment, engage with objects to be transported, and avoid obstructions. In various embodiments, the sensor data from one or more of the sensors 150 can be used for detecting objects, e.g., pallets with payloads and obstructions, such as hazards, humans, other robotic vehicles, and/or congestion during navigation. The sensors 150 can include one or more cameras, stereo cameras 152, radars, and/or laser imaging, detection, and ranging (LiDAR) scanners 154.

One or more of the sensors 150 can form part of a two-dimensional (2D) or three-dimensional (3D) high-resolution imaging system used for navigation and/or object detection. In some embodiments, one or more of the sensors can be used to collect sensor data used to represent the environment and objects therein using point clouds to form a 3D evidence grid of the space, each point in the point cloud representing a probability of occupancy of a real-world object at that point in 3D space. In some embodiments, the sensors 150 can include sensors configured to detect objects in the payload area and/or behind the forks 110*a,b*.

Figure 1:
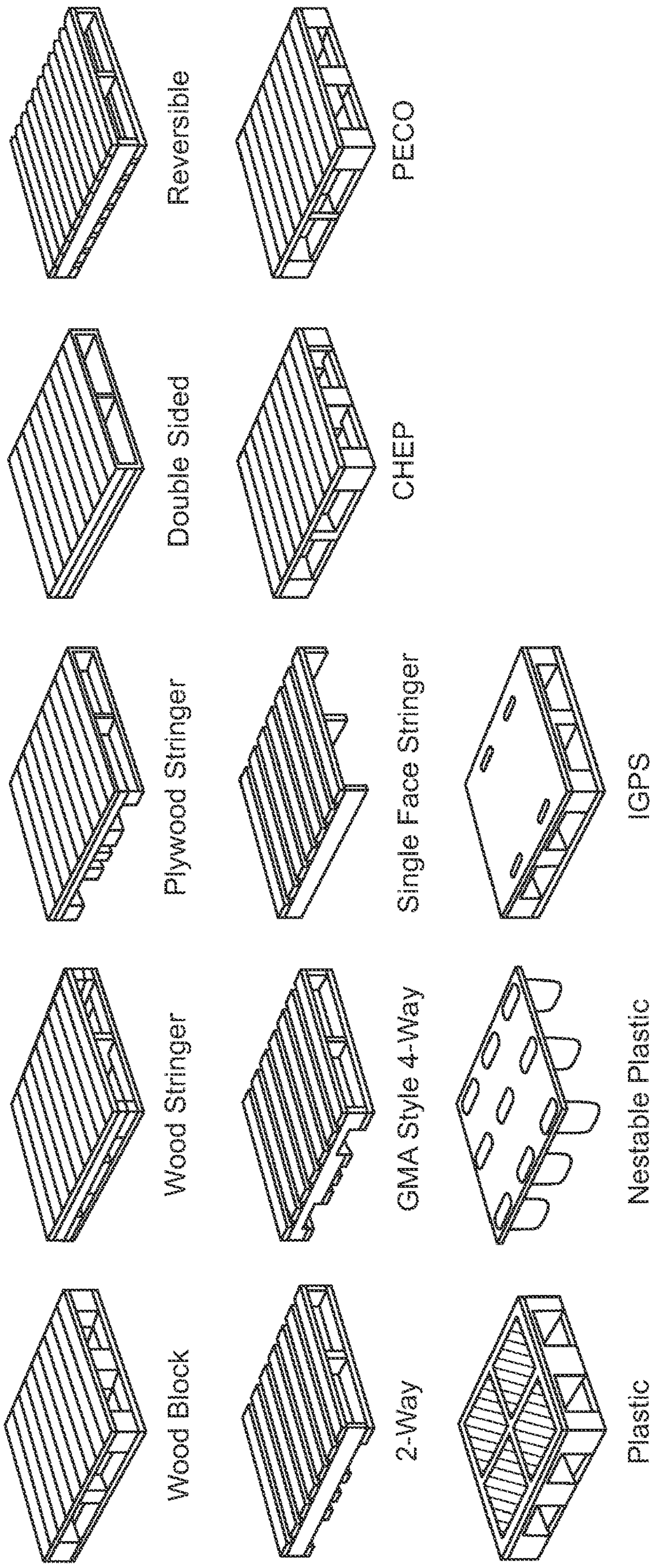
FIG. 1 (Prior Art)
FIG. 1 provides embodiments of various types of pallets known in the art.

In some embodiments, the sensors 150 can include one or more stereo cameras 152 and/or other volumetric sensors, sonar sensors, radars, and/or laser imaging, detection, and ranging (LiDAR) scanners or sensors 154, as examples. In the embodiment shown in FIG. 1, there are two LiDAR devices 154*a*, 154*b* positioned at the top left and right of the robotic vehicle 100. In the embodiment shown in FIG. 1, at least one of the LiDAR devices 154*a,b* can be a 2D or 3D LiDAR device. In alternative embodiments, a different number of 2D or 3D LiDAR device are positioned near the top of the robotic vehicle 100. Also, in this embodiment a LiDAR 157 is located at the top of the mast. In some embodiments LiDAR 157 is a 2D LiDAR used for localization.

In computer vision and robotic vehicles, a typical task is to identify specific objects in an image and to determine each object's position and orientation relative to a coordinate system. This information, which is a form of sensor data, can then be used, for example, to allow a robotic vehicle to manipulate an object or to avoid moving into the object. The combination of position and orientation is referred to as the "pose" of an object. The image data from which the pose of an object is determined can be either a single image, a stereo image pair, or an image sequence where, typically, the camera as a sensor 150 is moving with a known velocity as part of the robotic vehicle.

FIG. 3 is a top view of an embodiment of the robotic vehicle of FIG. 2. From this view, forks 110*a,b* are shown and outriggers 108 include outriggers 108*a,b*. At the end of one or both of forks 110*a* and 110*b* is a built-in sensor 158, which can be one of the plurality of sensors 150. In the embodiment shown, the tip of each fork 110,1,b includes a respective built-in LiDAR scanner 158*a,b*. In other embodiments, other types of sensors and/or scanners could be used. In other embodiments, additional or alternative sensors could be used located on different parts of the robotic vehicle 100. As an example, in various embodiments, the fork tip scanners 158*a,b* can be as shown and described in US Patent Publication Number 2022-0100195, published on Mar. 31, 2022, which is incorporated herein by reference.

In various embodiments, each of the fork tip sensors 158*a* and 158*b* generates a scanning plane 157*a* and 157*b*, respectively. The scanning planes 157*a,b* can overlap and provide two sources of scanning data for points on a pallet 104 to be engaged, e.g., picked up and transported. Scanning data from the scanning places 157*a,b* can be processed by the robotic vehicle 100 to determine a pose of the pallet 104.

FIG. 4 is a block diagram of components and/or functional modules of an embodiment of the robotic vehicle 100 of FIGS. 2 and 3 incorporating pose validation technology in accordance with principles of inventive concepts. The embodiment of FIG. 4 is an example; other embodiments of the robotic vehicle 100 functional modules can include other components and/or terminology. In the example embodiment shown in FIGS. 2 and 3, the robotic vehicle 100 is a warehouse robotic vehicle.

The various functional elements of the robotic vehicle 100, e.g., components and/or modules, can be housed within the housing 115. Such functional elements can include at least one processor 10 coupled to at least one memory 12 to cooperatively operate the vehicle and execute its functions or tasks. The memory 12 can include computer program instructions, e.g., in the form of a computer program product, executable by the processor 10. The memory 12 can also store various types of data and information. Such data and information can include route data, path data, path segment data, pallet pose data, vehicle pose data, pick data, location data, environmental data, and/or sensor data, as examples, as well as the electronic map of the environment.

In this embodiment, the processor 10 and memory 12 are shown onboard the robotic vehicle 100 of FIG. 4, but external (offboard) processors, memory, and/or computer program code could additionally or alternatively be provided. That is, in various embodiments, the processing and computer storage capabilities can be onboard, offboard, or some combination thereof. For example, some processor and/or memory functions could be distributed across other vehicles and/or other systems external to the robotic vehicle 100.

In various embodiments, the robotic vehicle 100 can interface and exchange information with one or more external systems, including a supervisor system, fleet management system, and/or warehouse management system (collectively "Supervisor 200"). In various embodiments, the supervisor 200 could be configured to perform, for example, fleet management and/or monitoring for a plurality of vehicles (e.g., AMRs) and, optionally, other assets within the environment. The supervisor 200 can be local or remote to the environment, or some combination thereof.

In various embodiments, the supervisor 200 can be configured to provide instructions and data to the robotic vehicle 100, and to monitor the navigation and activity of the robotic vehicle and, optionally, other robotic vehicles. The robotic vehicle can include a communication module 160 configured to enable communications with the supervisor 200 and/or any other external systems. The communication module 160 can include hardware, software, firmware, receivers and transmitters that enable communication with the supervisor 200 and any other external systems over any now known or hereafter developed communication technology, such as various types of wireless technology including, but not limited to, WiFi, Bluetooth, cellular, global positioning system (GPS), radio frequency (RF), and so on.

As an example, the supervisor 200 could wirelessly communicate a path for the robotic vehicle 100 to navigate for the vehicle to perform a task or series of tasks. The path can be relative to a map of the environment stored in memory and, optionally, updated from time-to-time, e.g., in real-time, from vehicle sensor data collected in real-time as the robotic vehicle 100 navigates and/or performs its tasks. The sensor data can include sensor data from one or more of the sensors 150. As an example, in a warehouse setting the path could include one or more stops along a route for the picking and loading and/or the unloading of goods and/or performing other tasks. The path can include a plurality of path segments. The navigation from one stop to another can comprise one or more path segments. The supervisor 200 can also monitor the robotic vehicle 100, such as to determine robotic vehicle's location within an environment, battery status and/or fuel level, and/or other operating, vehicle, performance, and/or load parameters.

In example embodiments, a path may be developed by "training" the robotic vehicle 100. That is, an operator may guide the robotic vehicle 100 through a path within the environment while the robotic vehicle, through a machine-learning process, learns and stores the path for use in task performance and builds and/or updates an electronic map of the environment as it navigates. The path may be stored for future use and may be updated, for example, to include more, less, or different locations, or to otherwise revise the path and/or path segments, as examples. In some embodiments, the trained path may include a trained pose of the robotic vehicle and/or a trained pose of the payload 106 (or pallet 104) at a pick-up location.

The functional elements of the robotic vehicle 100 can further include a navigation module 170 configured to access environmental data, such as the electronic map, and path information stored in memory 12, as examples. The navigation module 170 can communicate instructions to a drive control subsystem 120 to cause the robotic vehicle 100 to navigate its path within the environment. During vehicle travel, the navigation module 170 may receive information from one or more sensors 150, via a sensor interface (I/F) 140, to control and adjust the navigation of the robotic vehicle. For example, the sensors 150 may provide sensor data to the navigation module 170 and/or the drive control subsystem 120 in response to sensed objects and/or conditions in the environment to control and/or alter the robotic vehicle's navigation. As examples, the sensors 150 can be configured to collect sensor data related to objects, obstructions, equipment, goods to be picked, hazards, completion of a task, and/or presence of humans and/or other robotic vehicles.

A safety module 130 can also make use of sensor data from one or more of the sensors 150, including LiDAR scanners 154, to interrupt and/or take over control of the drive control subsystem 120 in accordance with applicable safety standard and practices, such as those recommended or dictated by the United States Occupational Safety and Health Administration (OSHA) for certain safety ratings. For example, if safety sensors detect objects in the path as a safety hazard, such sensor data can be used to cause the drive control subsystem 120 to stop the vehicle to avoid the hazard.

The sensors 150 can include one or more stereo cameras 152 and/or other volumetric sensors, sonar sensors, and/or LiDAR scanners or sensors 154, as examples. Inventive concepts are not limited to particular types of sensors. In various embodiments, sensor data from one or more of the sensors 150, e.g., one or more stereo cameras 152 and/or LiDAR scanners 154, can be used to generate and/or update a 2-dimensional or 3-dimensional model or map of the environment, and sensor data from one or more of the sensors 150 can be used for the determining location of the robotic vehicle 100 within the environment relative to the electronic map of the environment. The sensors 150 can also include one or more payload area scanners 156 and/or one or more fork tip scanners 158.

Examples of stereo cameras arranged to provide 3-dimensional vision systems for a vehicle, which may operate at any of a variety of wavelengths, are described, for example, in U.S. Pat. No. 7,446,766, entitled Multidimensional Evidence Grids and System and Methods for Applying Same and U.S. Pat. No. 8,427,472, entitled Multi-Dimensional Evidence Grids, which are hereby incorporated by reference in their entirety. LiDAR systems arranged to provide light curtains, and their operation in vehicular applications, are described, for example, in U.S. Pat. No. 8,169,596, entitled System and Method Using a Multi-Plane Curtain, which is hereby incorporated by reference in its entirety.

In various embodiments, the robotic vehicle 100 can include an obstruction detection and avoidance module 185. The obstruction and detection module 185 can process sensor data from one or more of the sensors 150 and determine if there is an obstruction in the path of the robotic vehicle. In some embodiments, the obstruction detection and avoidance module generates a signal, based on processing of the sensor data, to the navigation module 170 to pause, stop, and/or otherwise alter the navigation of the vehicle to avoid collisions with detected obstructions.

In example embodiments, the robotic vehicle 100 may use and/or include a pose validation module 180. In various embodiments, the pose validation module 180 comprises computer program code stored in memory 12 and executable by the at least one processor 10 to cause the robotic vehicle 100 to determine a pose of the payload to be picked based on the real-time senor data from the sensors 150, such as sensors 156 and/or 158. That is, in various embodiments, using the pose validation module 180 in cooperation with the navigation module, the robotic vehicle 100 can determine the pose of the payload 106 (or pallet 104) and adjusts its pose in real-time to properly align the forks 110 with pocket openings of the pallet 104. The sensor data acquired in real-time from sensors 156 and/or 158 can be combined with sensor data previously acquired and/or other real-time information about the environment from one or more of the other sensors 150.

The pose validation module 180 may communicate with the obstruction detection and avoidance module 185 and/or navigation module 170 to alter the pose of the robotic vehicle if the pose of the robotic vehicle at the payload engagement location, i.e., pick location, could not be validated, meaning the robotic vehicle would collide with infrastructure if it took the intended pose, or "goal" pose, at the pick location. The robotic vehicle can be configured to iteratively orient itself and again execute pose validation until the robotic vehicle takes a pose that allows it to engage the payload without collision with the infrastructure around and/or supporting the payload.

Referring to FIGS. 2, 3, 4, and 5, the robotic vehicle 100 is shown at a pick location where the payload 106, including pallet 104, is to be picked. Using a combination of sensors, the robotic vehicle 100 is configured to determine a pose of the payload 106 and/or pallet 104 and evaluate whether the desired pose of the robotic vehicle will result in collision with infrastructure 580 that the payload rests upon. The robotic vehicle can include one or more sensors, such as 2D sensors and/or 3D sensors, as discussed above. In some embodiments, the sensors can include cameras, SLAM, and/or LiDAR sensors. Two or more of such sensors can be used in combination to collect sensor data. In various embodiments, the sensor data is 3D data. In various embodiments, the 3D data is point cloud data. SLAM refers to simultaneous localization and mapping or synchronized localization and mapping. LiDAR refers to light detection and ranging or laser imaging, detection, and ranging, as an example of a ranging and detection system.

Point cloud data can be determined from at least one sensor, such as a 3D sensor. A 3D sensor can be a stereo camera and/or a 3D LiDAR, as examples. Point cloud data is sensor data representing occupancy of voxels in a 3D grid representing the real world. If a voxel is indicated as occupied, then an object exists in the corresponding point in the real world.

In various embodiments, determining a pose of a payload 106 and/or pallet 104 and evaluating whether the desired pose of the robotic vehicle 100 will result in collision with infrastructure 580 that the payload rests upon is accomplished by the processor 10 evaluating the sensor data from one or more of sensors 150, such as point cloud data, of the region surrounding the payload and evaluating whether the points in those clouds intersect with the chassis 190 of the robotic vehicle. This can be done as a multi-step process that both allows for efficient processing of points in the clouds, while also allowing for complex interactions with infrastructure, such as allowing outriggers 108 to move in underneath infrastructure 580, e.g., a table or conveyor system.

Properly configured robotic vehicles, such as AMR forklifts, utilizing pose validation can realize various advantage in accordance with the inventive concepts, such as:

1. Allows for dynamic planning to get the robotic vehicle into an optimal pose for interacting with a payload while preventing collisions with fixed infrastructure.
2. Allows protruding portions of the chassis to move into open regions of fixed infrastructure (for example, outriggers moving underneath a table).
3. It is computationally more efficient than a purely 3D approach.

In various embodiments, an robotic vehicle is configured to have the following sensing capabilities:

1. At least one first sensor, e.g., sensors 156 and/or 152, that can perform payload detection that can determine the pose of the payload.
2. At least one second sensor, e.g., sensor 152, that can provide 3D point cloud data showing objects in the region that contains the payload and infrastructure.

Figure 7:
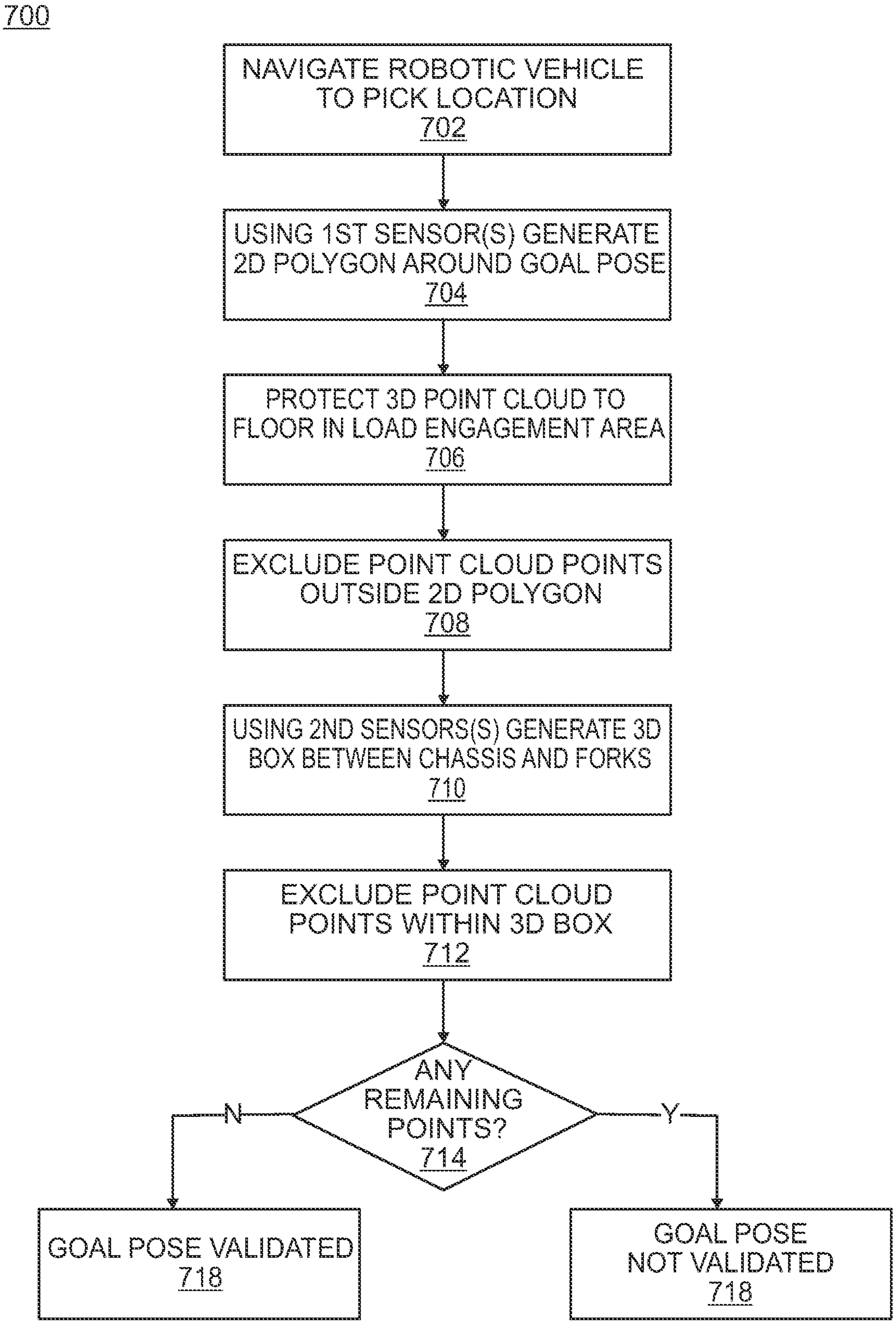
FIG. 7 is a pose validation method executable by a robotic vehicle, in accordance with aspects of the inventive concepts.

FIG. 7 provides an embodiment of pose validation method 700 that can be implemented by the robotic vehicle 100. Referring to FIGS. 5, 6, and 7, using the pose of the payload provided by the at least one first sensor, the pose validation module 180 determines the necessary pose of the chassis 190 and/or robotic vehicle 100 required to interact with the payload 106 and/or pallet 104. This is referred to as the "goal" pose.

In various embodiments of method 700, the robotic vehicle is configured to process sensor data from at least one sensor to generate at least one 2D polygon and/or at least one 3D volume between the AMR and the infrastructure to determine if the goal pose of the robotic vehicle will result in a collision with infrastructure.

In various embodiments, once the robotic vehicle is navigated to the pick location, in step 702, the goal pose is evaluated by the pose validation module 180 to determine if the robotic vehicle can engage the payload without colliding with the infrastructure as follows (See FIGS. 5, 6, and 7):

1. In step 704, a basic 2D polygon 610 of the footprint of the chassis is generated around the goal pose 600 at the floor level. As the manipulator (e.g., forks 110) will be making contact with the payload 106, the shape of the manipulator is not included in the 2D polygon 210. In step 706, a 3D point cloud is projected to the floor and evaluated against this polygon 610 using a point-in-polygon evaluation. In step 708, any points from the 3D point cloud that lie outside the polygon 610 (see point cloud points 630) are discarded from the 3D point cloud and not used for obstruction detection.
2. In step 710, at least one 3D box 620 (see FIGS. 5 and 6) is generated to cover the empty spaces between any protruding or extending portions of the robotic vehicle from the rest of the chassis 190, e.g., outriggers 108. For example, between the bottoms of the forks 110 and the tops of the outriggers 108 on a fork-lift robotic vehicle. In step 712, any points in the 3D point cloud that are within these boxes are discarded, and not used for obstruction detection, as they represent space that will not end up colliding with the AMR.
3. If any points are remaining and have not been discarded by the previous two steps, then the goal pose 600 will be determined to not be achievable for the chassis 190 of the robotic vehicle 100, in step 716. If there are no points remaining, then the goal pose will be validated as achievable, in step 718. If the goal pose is validated, then the robotic vehicle 100 engage the payload 106 without collision with the infrastructure 580.

By making use of a 2D projection to exclude some point cloud paints, a more computationally efficient method is used to reduce the number of 3D points that must be evaluated in later steps. This reduces the amount of 3D calculations necessary to perform the pose validation.

In various embodiments, provided is a system configured to validate a pose for an AMR that allows it to interact with an object that may be located on top of some form of infrastructure, such as a table, conveyor belt or cart, which can comprise:

a. A mobile robotics platform, such as an AMR.

b. A mechanism for collecting point cloud data, such as a LiDAR scanner or 3D camera.

c. A mechanism for finding and localizing the pose of an object to interact with, such as a Pallet Detection System.

d. A local (onboard) computer for processing.

In various embodiments, therefore, the method 700 includes utilizing the robotic vehicle 100 to validate that the robotic vehicle can occupy the pose 600 (or goal pose) that allows it to interact with the desired object without colliding with adjacent objects or infrastructure 580, which can comprise 2D evaluation of the area 610 occupied by the robotic vehicle 100 to find potential colliding objects quickly and 3D exclusion of a box region 620 between the forks and the outriggers to allow the forks to move in above while the outriggers move in below infrastructure, such as a table top.

If a potential collision is detected, the pose validation system 180 can generate a signal to the navigation system to adjust the robotic vehicle's pose to avoid the collision. This can include re-executing the method 700 each time the robotic vehicle takes a new pose proximate the payload 106 and infrastructure 580.

While the foregoing has described what are considered to be the best mode and/or other preferred embodiments, it is understood that various modifications may be made therein and that the invention or inventions may be implemented in various forms and embodiments, and that they may be applied in numerous applications, only some of which have been described herein. It is intended by the following claims to claim that which is literally described and all equivalents thereto, including all modifications and variations that fall within the scope of each claim.

What is claimed is:

1. An autonomous mobile robot (AMR), comprising:

a chassis and a manipulatable payload engagement portion;

sensors configured to acquire real-time sensor data;

a pose validation system comprising computer program code executable by at least one processor to evaluate the sensor data to:

determine a pose of an object located on an infrastructure;

process at least some of the sensor data to generate at least one exclusion region and/or volume; and exclude sensor data from the at least one exclusion region and/or volume to determine whether the AMR will collide with the infrastructure if a pose of the AMR matches the goal pose.

2. The AMR of claim 1, the AMR is configured to adjust a pose of the AMR if a potential collision with the infrastructure is determined.

3. The AMR of claim 1, wherein the pose validation system is configured to process at least some of the sensor data from at least one sensor to generate at least one two-dimensional (2D) polygon and/or at least one three-dimensional (3D) volume between the AMR and the infrastructure to determine whether the AMR taking the goal pose will result in a collision with infrastructure.

4. The AMR of claim 1, wherein the pose validation system is configured to process sensor data from at least one first sensor to generate a two-dimensional (2D) polygon around the goal pose and to exclude points from the outside the 2D polygon to determine whether the AMR taking the goal pose will result in a collision with infrastructure.

5. The AMR of claim 1, wherein the pose validation system is configured to process sensor data from at least one second sensor to generate a three-dimensional (3D) volume between the chassis and the payload engagement portion and to exclude points from the 3D volume to determine whether the AMR taking the goal pose will result in a collision with infrastructure.

6. The AMR of claim 5, wherein the at least one first sensor includes a sensor different from the at least one second sensor.

7. The AMR of claim 1, wherein the payload engagement portion is a pair of forks and the chassis includes outriggers and the 3D volume is located between the forks and the outriggers.

8. The AMR of claim 7, wherein one or more of the forks includes at least one LiDAR scanner.

9. The AMR of claim 1, wherein at least some of the sensor data includes point cloud data.

10. The AMR of claim 1, wherein the sensors include at least one 3D camera.

11. The AMR of claim 1, wherein the sensors include at least one LiDAR scanner.

12. The AMR of claim 1, wherein the infrastructure includes a table and/or a shelf.

13. A pose validation method, comprising:

providing an autonomous mobile robot (AMR) having a chassis and a manipulatable payload engagement portion, sensors configured to acquire real-time sensor data, and a pose validation system comprising computer program code executable by at least one processor; and the pose validation system evaluating at least some of the sensor data to validate a pose of the AMR, including:

determining a pose of an object located on or near an infrastructure;

processing at least some of the sensor data to generate at least one exclusion region and/or volume; and excluding sensor data from the at least one exclusion region and/or volume to determine whether the AMR will collide with the infrastructure if a pose of the AMR matches the goal pose.

14. The method of claim 13, further comprising the AMR adjusting its pose if a potential collision with the infrastructure is determined.

15. The method of claim 13, further comprising processing at least some of the sensor data from at least one sensor to generate at least one two-dimensional (2D) polygon and/or at least one three-dimensional (3D) volume between the AMR and the infrastructure to determine whether the AMR taking the goal pose will result in a collision with infrastructure.

16. The method of claim 13, further comprising processing at least some of the sensor data from at least one first sensor to generate a two-dimensional (2D) polygon around the goal pose and excluding points from the outside the 2D polygon to determine whether the AMR taking the goal pose will result in a collision with infrastructure.

17. The method of claim 13, further comprising processing at least some of the sensor data from at least one second sensor to generate a three-dimensional (3D) volume between the chassis and the payload engagement portion and excluding points from the 3D volume to determine whether the AMR taking the goal pose will result in a collision with infrastructure.

18. The method of claim 17, wherein the at least one first sensor includes a sensor different from the at least one second sensor.

19. The method of claim 17, wherein the 3D volume is located between the forks and the outriggers.

20. The method of claim 19, wherein one or more of the forks includes at least one LiDAR scanner.

21. The method of claim 13, wherein at least some of the sensor data includes point cloud data.

22. The method of claim 13 wherein the sensors include at least one 3D camera.

23. The method of claim 13, wherein the sensors include at least one LiDAR scanner.

24. The method of claim 13 wherein the infrastructure includes a table and/or a shelf.

* * * * *